United States Patent
Lindner et al.

(10) Patent No.: US 11,920,998 B2
(45) Date of Patent: Mar. 5, 2024

(54) MICROFLUIDIC OR MILLIFLUIDIC CHIP COMPRISING A PRESSURE SENSING UNIT USING COLOUR-SWITCHING HYDROGELS

(71) Applicants: PARIS SCIENCES ET LETTRES, Paris (FR); Centre National de la Recherche Scientifique, Paris (FR); École Supérieure de Physique et de Chimie Industrielles de la Ville de Paris, Paris (FR); Sorbonne Université, Paris (FR); Université Paris Cité, Paris (FR)

(72) Inventors: Anke Lindner, Paris (FR); Lucie Ducloué, Sèvres (FR); Md. Anamul Haque, Dacca (BD); Jian-Ping Gong, Sapporo (JP)

(73) Assignees: PARIS SCIENCES ET LETTRES, Paris (FR); École Supérieure de Physique et de Chimie Industrielles de la Ville de Paris, Paris (FR); Centre National de la Recherche Scientifique, Paris (FR); Sorbonne Université, Paris (FR); Université Paris Cité, Paris (FR)

( * ) Notice: Subject to any disclaimer, the term of this patent is extended or adjusted under 35 U.S.C. 154(b) by 3 days.

(21) Appl. No.: 17/785,383

(22) PCT Filed: Dec. 18, 2020

(86) PCT No.: PCT/EP2020/087148
§ 371 (c)(1),
(2) Date: Jun. 14, 2022

(87) PCT Pub. No.: WO2021/123252
PCT Pub. Date: Jun. 24, 2021

(65) Prior Publication Data
US 2023/0019208 A1    Jan. 19, 2023

(30) Foreign Application Priority Data

Dec. 19, 2019 (EP) .................................. 19306702

(51) Int. Cl.
*G01L 9/00* (2006.01)
*G01L 27/00* (2006.01)

(52) U.S. Cl.
CPC .......... *G01L 9/0077* (2013.01); *G01L 27/002* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 11,643,625 B2 * 5/2023 Gobaa .................... C12M 21/08
435/284.1

FOREIGN PATENT DOCUMENTS

CN    105218740 B         9/2018
CN    115541099 A    *    12/2022
(Continued)

OTHER PUBLICATIONS

Foreign Communication from a Related Counterpart Application, International Search Report and Written Opinion dated Apr. 9, 2021, International Application No. PCT/EP2020/087148 filed on Dec. 18, 2020.
(Continued)

*Primary Examiner* — Andre J Allen

(57) ABSTRACT

The present invention relates to microfluidic or millifluidic chips (1) comprising at least one pressure sensing unit (4) able to measure a fluid flow pressure. The present invention also relates to a method for a direct and contact-free measuring of a local pressure of a fluid circulating in a micro-
(Continued)

fluidic circuit, using a microfluidic or millifluidic chips (1) according to the invention.

11 Claims, 5 Drawing Sheets

(58) Field of Classification Search
CPC ............ G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/065; G01L 9/12; G01L 19/0618; G01L 9/0052; G01L 7/16; G01L 9/125; G01L 19/0609; G01L 19/003; G01L 9/007; G01L 9/0022; G01L 19/0046; G01L 19/0627; G01L 9/06; G01L 19/0636; G01L 7/084; G01L 13/02; G01L 19/0023; G01L 19/142; G01L 7/043; G01L 19/08; G01L 9/0002; G01L 9/008; G01L 19/02; G01L 19/141; G01L 9/006; G01L 11/02; G01L 23/10; G01L 23/18; G01L 19/0672; G01L 19/0681; G01L 9/0077; G01L 19/12; G01L 27/005; G01L 7/082; G01L 9/0044; G01L 19/0069; G01L 19/0015; G01L 7/063; G01L 9/0001; G01L 19/146; G01L 21/12; G01L 9/16; G01L 27/002; G01L 11/00; G01L 27/007; G01L 9/0026; G01L 19/00; G01L 9/0089; G01L 9/045; G01L 9/14; G01L 1/2281; G01L 11/025; G01L 19/0654; G01L 11/008; G01L 7/22; G01L 13/026; G01L 9/0047; G01L 13/00; G01L 9/0025; G01L 9/0076; G01L 9/0035; G01L 19/0061; G01L 9/0005; G01L 9/0019; G01L 9/08; G01L 9/10; G01L 21/00; G01L 11/006; G01L 7/08; G01L 9/0041; G01L 9/04; G01L 9/0008; G01L 19/086; G01L 1/18; G01L 11/004; G01L 19/069; G01L 9/0057; G01L 19/083; G01L 19/10; G01L 19/16; G01L 13/023; G01L 7/048; G01L 9/0016; G01L 9/00; G01L 9/0027; G01L 9/0048; G01L 9/0086; G01L 19/06; G01L 9/0079; G01L 11/04; G01L 9/0091; G01L 1/20; G01L 11/002; G01L 23/24; G01L 7/182; G01L 19/0663; G01L 7/166; G01L 1/02; G01L 23/22; G01L 27/00; G01L 9/0036; G01L 9/0061; G01L 9/0039; G01L 23/125; G01L 9/0013; G01L 19/145; G01L 9/0092; G01L 21/04; G01L 9/0045; G01L 7/104; G01L 9/0033; G01L 1/142; G01L 9/0083; G01L 9/0098; G01L 7/24; G01L 1/2293; G01L 21/22; G01L 9/0029; G01L 9/02; G01L 9/0064; G01L 7/022; G01L 1/205; G01L 5/14; G01L 23/08; G01L 23/16; G01L 7/088; G01L 7/163; G01L 9/0007; G01L 1/16; G01L 13/06; G01L 23/222; G01L 1/2287; G01L 9/0085; G01L 1/2212; G01L 9/025; G01L 21/14; G01L 9/0004; G01L 23/02; G01L 9/003; G01L 9/085; G01L 1/14; G01L 1/148; G01L 9/0058; G01L 9/105; G01L 7/061; G01L 9/002; G01L 7/02; G01L 13/028; G01L 1/2231; G01L 23/28; G01L 9/0095; G01L 1/162; G01L 7/12; G01L 9/0038; G01L 19/0076; G01L 9/0032; G01L 21/10; G01L 7/024; G01L 19/149; G01L 1/246; G01L 7/086; G01L 1/005; G01L 7/06; G01L 5/228; G01L 7/102; G01L 1/2206; G01L 13/021; G01L 27/02; G01L 1/2262; G01L 1/24; G01L 1/26; G01L 23/00; G01L 9/0094; G01L 19/144; G01L 9/0082; G01L 1/125; G01L 11/06; G01L 9/0097; G01L 1/2268; G01L 21/30; G01L 21/34; G01L 23/221; G01L 7/187; G01L 7/20; G01L 23/26; G01L 7/068; G01L 1/225; G01L 23/32; G01L 7/14; G01L 1/144; G01L 1/146; G01L 1/165; G01L 23/12; G01L 1/241; G01L 7/045; G01L 1/086; G01L 13/04; G01L 7/108; G01L 9/18; G01L 1/127; G01L 1/22; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 1/186; G01L 23/223; G01L 25/00; G01L 5/165; G01L 5/226; G01L 9/001; G01L 9/0017; G01L 1/044; G01L 3/245; G01L 1/08; G01L 21/16; G01L 3/1485; G01L 5/162; G01L 5/225; G01L 7/026; G01L 7/065; G01L 9/0014; G01L 9/005; G01L 1/04; G01L 1/242; G01L 21/24; G01L 3/10; G01L 5/0004; G01L 5/0052; G01L 1/00; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/0028; G01L 5/243; G01L 1/083; G01L 1/12; G01L 21/36; G01L 23/04; G01L 23/14; G01L 23/30; G01L 3/103; G01L 5/00; G01L 5/102; G01L 5/133; G01L 5/166; G01L 7/185; G01L 1/255; G01L 21/08; G01L 5/0033; G01L 5/0057; G01L 5/161; G01L 5/22; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/1627; G01L 5/167; G01L 5/28; G01L 1/046; G01L 23/085; G01L 23/20; G01L 5/0071; G01L 5/008; G01L 5/06; G01L 5/171; G01L 7/106
USPC .................................................. 73/700–756
See application file for complete search history.

(56) References Cited

FOREIGN PATENT DOCUMENTS

| | | |
|---|---|---|
| WO | 2021123252 A1 | 6/2021 |
| WO | WO-2021123252 A1 * | 6/2021 ............ G01L 11/02 |

(56) References Cited

FOREIGN PATENT DOCUMENTS

OTHER PUBLICATIONS

P. Escudero, et al: "Color tunable pressure sensors based on polymer nanostructured membranes for optofluidic applications", Scientific reports, Mar. 1, 2019 (Mar. 1, 2019), pp. 3259-10, XP055665256.
Wuzhou Song and Demetri Psaltis: "Optofluidic pressure sensor based on interferometric imaging", Optics Letters, Optical Society of America, US, vol. 35, No. 21, Nov. 1, 2010 (Nov. 1, 2010), pp. 3604-3606, XP001558202.

\* cited by examiner

[Fig. 1]
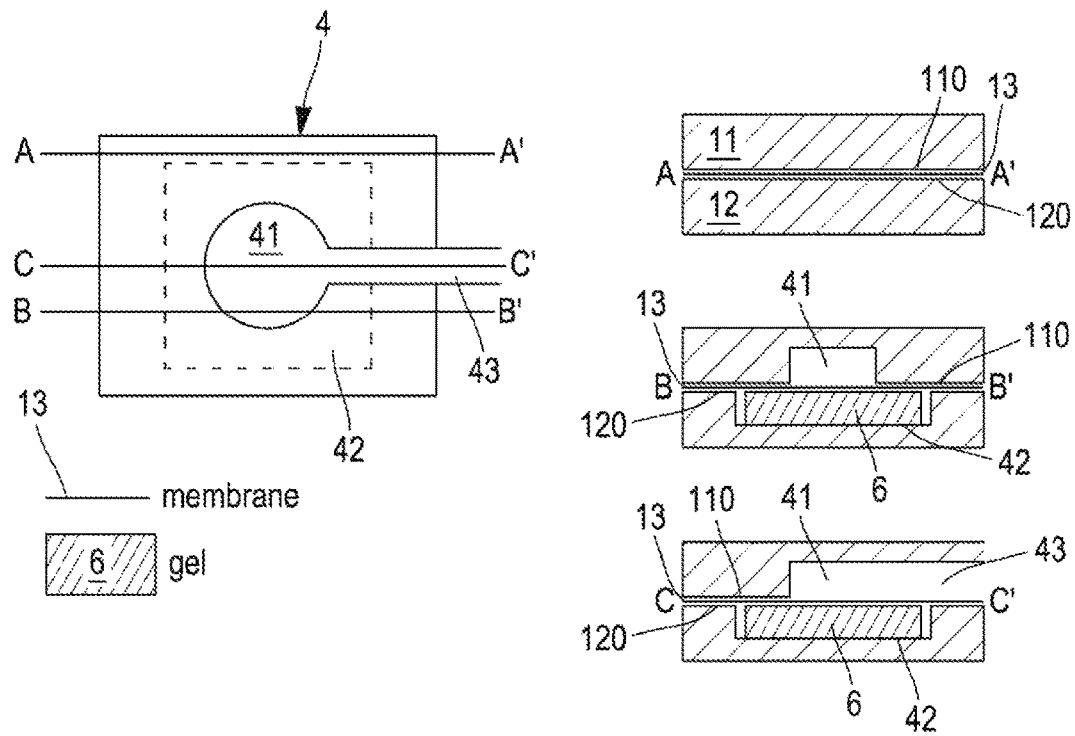
[Fig. 2]
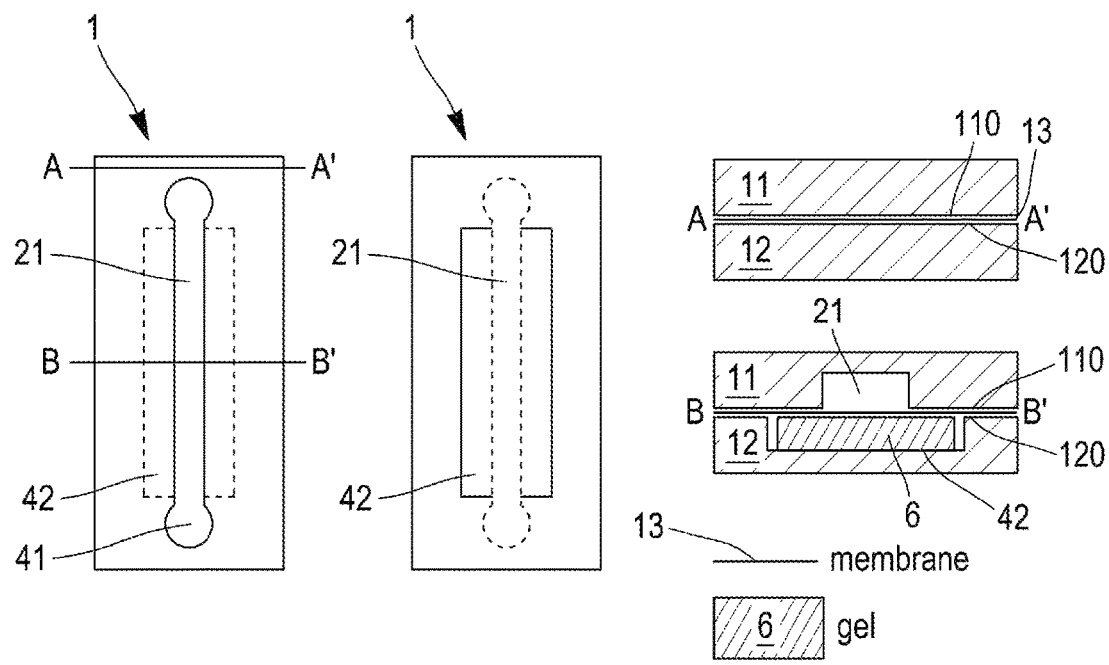

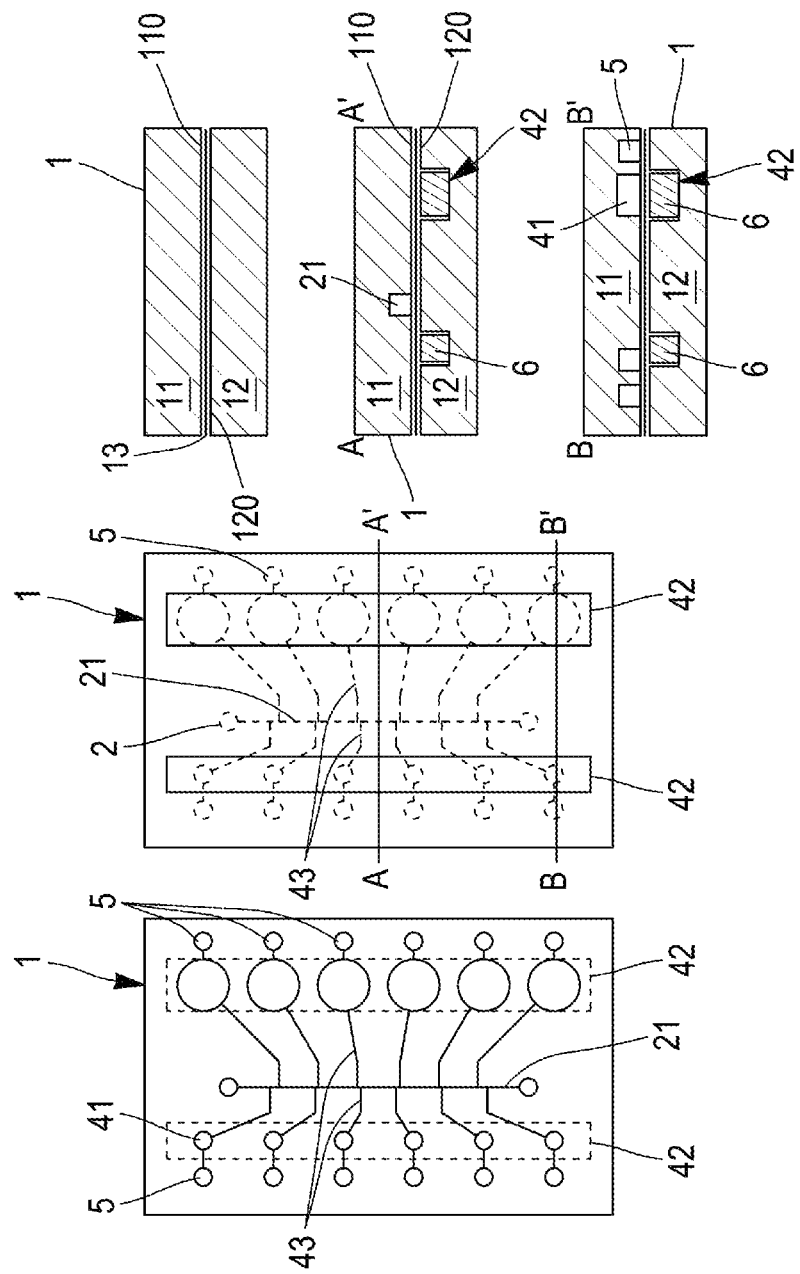

MICROFLUIDIC OR MILLIFLUIDIC CHIP COMPRISING A PRESSURE SENSING UNIT USING COLOUR-SWITCHING HYDROGELS

CROSS-REFERENCE TO RELATED APPLICATIONS

The present application is a filing under 35 U.S.C. 371 as the National Stage of International Application No. PCT/EP2020/087148, filed Dec. 18, 2020, entitled "MICROFLUIDIC OR MILLIFLUIDIC CHIP COMPRISING A PRESSURE SENSING UNIT USING COLOUR-SWITCHING HYDROGELS," which claims priority to European Application No. 19306702.2 filed with the European Intellectual Property Office on Dec. 19, 2019, both of which are incorporated herein by reference in their entirety for all purposes.

TECHNICAL FIELD

Various example embodiments relate to microfluidic or millifluidic chips comprising at least one pressure sensing unit able to measure a fluid flow pressure.

BACKGROUND

The widening applications of microfluidic devices have increased the need for reliable pressure sensing in those systems. Pressure sensing in such small fluidic circuits, however, is complicated by specific challenges stemming from the design of microfluidic chips. The lab-on-a-chip layout, first, requires that the sensor be fully integrable to the chip, and so most commonly to PDMS architectures. The sensitivity of the sensor is a second challenge, given that the pressure changes along short fluid sections can be minute.

Several methods have been proposed to overcome these difficulties, which rely on soft sensing elements that deform under pressure. This deformation is then usually measured via electric methods (piezoelectric pillars[1], conductive liquid circuits[2], conductive inflating membrane[3]). Such methods require that the microfluidic chip is wired to external electrical apparatuses, which may not be convenient. Optical methods for the detection of the deformation of sensing elements have been proposed, and overcome this drawback: deformation of an optical grating[4], interference pattern in a deformed cavity[5], light focusing through an inflating membrane[6], or, very recently, nano-structured photonic inflating membranes[7].

All those methods enable remote sensing of the fluid pressure, but the soft deforming element is in all cases directly coupled to the flow channel. The deformation of the soft element, necessary for the pressure measurement thus changes the flow geometry. This change in flow geometry in return modified the pressure distribution in the flow channel. The pressure sensing thus modifies the fluid pressure it is supposed to measure.

The one proposed by Orth et al.[6] stands out as being the only method in which the sensing element is decoupled from the flow path of the fluid: therefore, the deformation of the sensor does not modify the geometry of the channel in which the fluid flows.

This is a large advantage compared to the other methods described above. The method described in [6] uses the deformation of circular membranes under an applied pressure for pressure sensing with the membrane deformation being proportional to the applied pressure. To quantify the membrane deformation a reflection method is used, where the size of a bright spot of the captured image is linked to the membrane deformation and thus the applied pressure via a calibration step. The calibration is very sensitive to smallest changes, for example in the angle of the illumination or image capture, modifying the result. In addition, the measure is localised to one spot and as a consequence the resolution of the method remains limited and restricted to pressures above 10 kPa. The method proposed there relies on a robust calibration where a change in colour can directly be linked to an applied pressure and in addition a spatial average can be made over the colour displayed in the sensing unit leading to a much-improved resolution and access to smaller pressures (i.e. down to 2 kPa) compared to the methods mentioned above.

SUMMARY OF THE INVENTION

In order to solve the previously mentioned drawbacks, the applicant has developed a first embodiment of a microfluidic or millifluidic chip comprising a microfluidic circuit with an embedded flow channel through which a fluid circulates and along which the fluid flow pressure is to be measured, and at least one separable pressure sensing unit that is positioned remotely from said main flow channel.

More particularly, a first object of the invention according to the first embodiment consists in a separable sensing unit able to measure a fluid pressure, characterized in that it comprises two layers made of a liquid-tight material (for instance made of moulded PDMS or glass) and a membrane,
    wherein one at least of said two layers is made of a material that is also light transparent,
    wherein said membrane is impermeable to the fluid (circulating in the channel) to be characterized and is able to deform under the pressure exerted by the fluid,
    characterized in that said layers and said membrane are arranged according to the following configuration:
      one layer is a top layer comprising an upper cavity,
      another layer that is a bottom layer comprising one lower cavity formed at its surface and facing the upper cavity of said top layer, said lower cavity containing a slab of a photonic hydrogel immersed in an aqueous buffer solution,
      said membrane separates the top layer from the bottom layer.

The two layers of the separable sensing unit may be made of two moulded PDMS layers, obtained by standard soft lithography techniques[9].

A second object of the invention according to the first embodiment consists in the above-mentioned microfluidic or millifluidic chip, and at least one separable pressure sensing unit according to the first object of the invention and positioned remotely from the main flow channel, at a distance so that the upper cavity of the pressure sensing unit is connected to the main flow channel via a side channel.

According to a second embodiment of the invention, the applicant has developed a third object consisting in microfluidic or millifluidic chip comprising:
    a microfluidic circuit with an embedded flow channel through which a fluid circulates and along which the fluid flow pressure is to be measured, and
    at least one integrated pressure sensing unit able to measure the fluid flow pressure at a position along said main flow channel,
    said microfluidic chip being characterized in that it comprises two layers made of a liquid-tight material (for instance made of moulded PDMS or glass) and a membrane,
      wherein one at least of said two layers is made of a material that is also light transparent, wherein said membrane is impermeable to the fluid circulating in the channel and is able to deform under the pressure exerted by the fluid, said layers and said membrane being arranged according to the following configuration:
- one layer is a top layer in which the main flow channel is embedded at a surface of the top layer facing
- another layer that is a bottom layer comprising one lower cavity formed at its surface and containing a slab of a photonic hydrogel immersed in an aqueous buffer solution.
- wherein said lower cavity is positioned so as to be placed directly at a position under the main flow channel,
- wherein said lower cavity containing the photonic gel and the part of the membrane covering said lower cavity form the sensing unit.

In the same manner as the separable pressing unit of the first embodiment, the two layers of the microfluidic or millifluidic chip according to the second embodiment may be made of two moulded PDMS layers, obtained by standard soft lithography techniques[9].

The microfluidic or millifluidic chip according to the first or second embodiments of the present invention enable local pressure measurements along any microfluidic fluid path. The sensing unit itself is based on the deformation of the membrane by a volume of the sensed fluid. This deformation causes the compression of an underlying slab of photonic hydrogel in the lower cavity, which changes colour in response to the deformation.

Advantageously, in the microfluidic or millifluidic chip according to the first and second embodiments of the present invention, the photonic hydrogel may be a soft photonic hydrogel.

By soft photonic hydrogel, it is meant in the present application a photonic hydrogel the Young's modulus of which is comparable to the pressure to be measured, for example, typically in the order of 1 to 100 kPa.

In the frame of the present invention, the soft photonic hydrogel described in the scientific publication of Yue, Y. et al.[8] may be used, since it can be actuated under very small compressive stress, exhibits an ultrafast response time and has high spatial resolution. This excellent space-time resolution allows the measurement of small pressures in microfluidic devices.

Advantageously, the microfluidic or millifluidic chip according to the first and second embodiments of the present invention may comprise a plurality of sensing units positioned at different location along the main flow channel, wherein the sensing units may present different or same sizes.

Advantageously, in the microfluidic or millifluidic chip according to the first and second embodiments of the present invention, each upper cavity is cylindrical in shape with a diameter of 0.1 to 10 mm, and preferably of 1 mm to 4 mm.

Advantageously, in the microfluidic or millifluidic chip according to the first and second embodiments of the present invention, each upper cavity may be connected to an outlet opposite to the main channel.

Advantageously, in the microfluidic or millifluidic chip according to the first and second embodiments of the present invention, each lower cavity may be connected to an in and outlet to circulate buffer fluid in the lower cavity such as to keep the gel immersed in the buffer fluid.

Advantageously, in the microfluidic or millifluidic chip according to the first and second embodiments of the present invention, the top layer and the bottom layer may be made of moulded PDMS, plastic material or glass.

A fourth object of the present invention is a method for a direct and contact-free measuring of a local pressure of a fluid circulating in a microfluidic circuit, said method comprising the following steps:
- A. providing a microfluidic or millifluidic chip according to the invention,
- B. imaging the photonic hydrogel contained in the lower cavity of the pressing unit of said microfluidic chip with a camera.

Step B of hydrogel imaging with the camera can be performed by a reflective observation of the pressing unit.

A fifth object of the present invention consists in the use of the method according to the fourth object of the invention, in which a microfluidic or millifluidic chip according to the second embodiment of the invention is used for measuring a dynamic pressure as low as 2 kPa (20 mbar) with a resolution below 50 Pa (5 mbar).

Yet another object of the invention consists in the use of the method according to the sixth object of the invention, in which a microfluidic or millifluidic chip according to the first and the second embodiments of the invention is used for measuring of a static pressure as low as 2 kPa (20 mbar) with a resolution below 50 Pa (5 mbar).

BRIEF DESCRIPTION OF THE FIGURES

Other innovative features and advantages of the invention will emerge from a reading of the following description followed by way of indication and in no way imitatively, with reference to the accompanying drawings, in which the figures illustrate schematically examples of implementation of the chips according to the invention. The figures are presented below:

FIG. 1 shows a schematic top view of a sensing unit 4 to the first embodiment, and three schematic cross-sectional views along lines (AA'), (BB') and (CC') (drawn on the top view), respectively;

FIG. 2 comprises schematic views of a microfluidic chip according to the second embodiment: a top view and its corresponding bottom view, together with two side views taken along lines A-A' and B-B' respectively (drawn on the bottom view);

FIG. 3 comprises schematic views of a microfluidic chip according to the first embodiment of the invention comprising several sensing units 4 of FIG. 1: a top view and its corresponding bottom view, together with three side views taken along lines A-A, B-B' and C-C' respectively (drawn on the bottom view).

FIG. 4 shows the calibration of a pressure sensing unit (4):

(bottom to top: 50 mbar, 500 μL/min, 100 mbar, 150 mbar); inset: top view of the sensors at a steady flow of 50 μL/min.

Figure 6A:
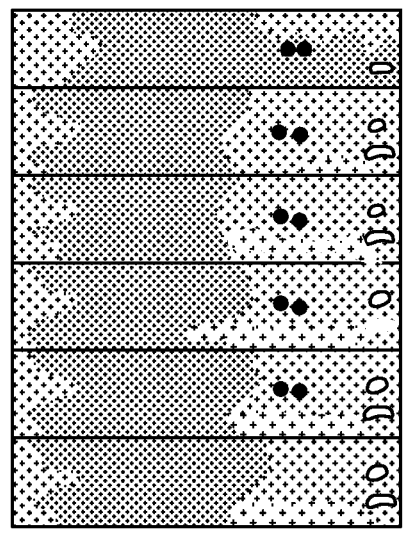
Figure 6B:
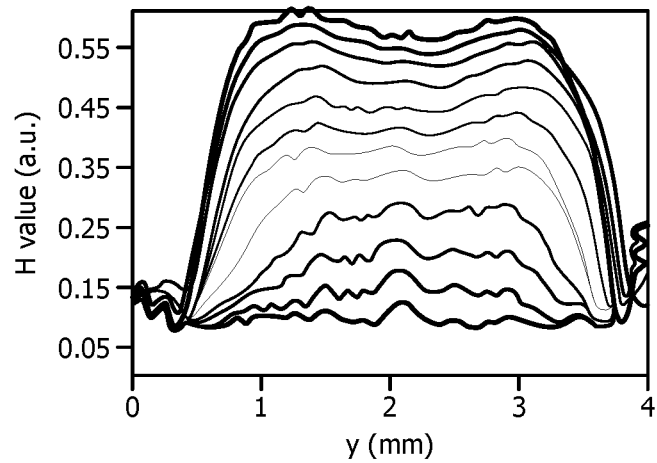
Figure 6C:
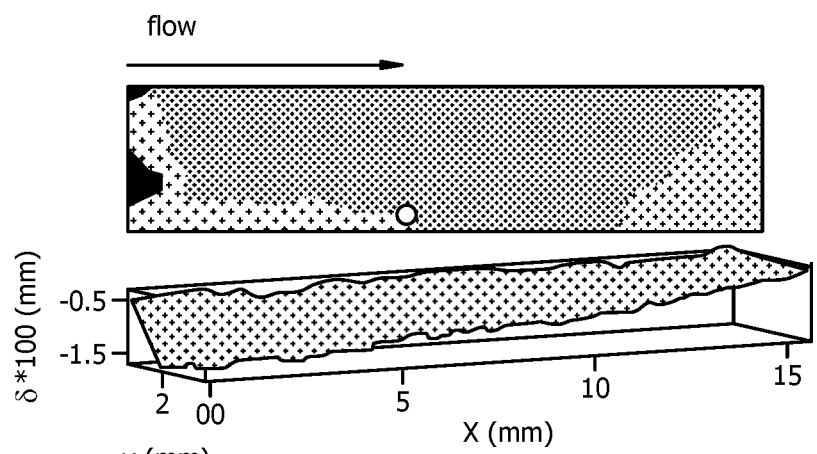

FIG. 6 shows the realisation of a microfluidic circuit 1 corresponding to the sketch displayed on FIG. 2 (FIG. 6a) and, in FIG. 6b, the local hue-value profile for increasing pressures. FIG. 6c shows the non-uniform pressure as imposed by a steady flow of liquid: visual information (top) and reconstruction of the local pressure using the calibration curve from FIG. 4(c) (bottom).

For clarity, the identical or similar elements are marked by identical signs on all the figures.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention.

Furthermore, any examples described herein are intended to aid in understanding the principles of the invention and are to be construed as being without limitation to such specifically recited examples and conditions. As a result, the invention is not limited to the specific embodiments or examples described below, but by the claims and their equivalents.

In the following description, well-known functions or constructions by the person skilled in the art are not described in detail since they would obscure the invention in unnecessary detail.

In the following description, the figures are commented on in detail in the examples and serve as a basis for them.

EXAMPLES

Example 1: Realisation of a Microfluidic Chip According to the First Embodiment In FIG. 3, a microfluidic chip according to the first embodiment is schematically represented, which comprises a microfluidic circuit 2 with an embedded flow channel 21 through which a fluid circulates and along which the fluid flow pressure is to be measured, and twelve separable pressure sensing units 4, which are represented in FIG. 1.

The main flow channel 21 is a straight channel having a length L and square cross-section.

Each sensing unit 4, as shown in FIG. 1, comprises two layers 11, 12 made of two moulded transparent PDMS layers obtained by standard soft lithography technique[9] and a thin and transparent PDMS membrane 13 that is able to deform under the pressure exerted by the fluid.

The top layer 11 comprises the flow channel 21 connected to 12 circular upper cavities 41, connected to the flow channel via a narrow microfluidic channel 43 (width 50 microns). 6 upper cavities of diameter 4 mm are arranged on one side and 6 of diameter 1 mm on the other side. The bottom layer 12 contains two large square lower cavities 42 containing a slab of the photonic gel 6 of thickness 200 μm.

The preparation of the photonic gel is described in example 3.

The height of the lower cavity closely matches the thickness of the gel. These lower cavities are sufficiently long to each completely cover 6 upper cavities. The two lower cavities are each connected to an in- and out-let allowing to circulate an aqueous buffer to assure the gel remains always immersed into the latter.

Each upper cavity reposing on the membrane and the lower cavity containing the hydrogel represents a pressure sensing unit 4: the membrane deforms under the pressure in the upper cavity and compresses the photonic gel in the lower cavity. Under this deformation the gel changes colour.

Each upper cavity is also connected to an outlet 5 opposite of its side channel 43. This outlet is left open during filling of the device (flow channel 21 and upper cavity 41), and then closed for the experiments so that only the ends of the main flow channel 21 remain connected to fluid sources during normal operation of the device.

Figure 5A:
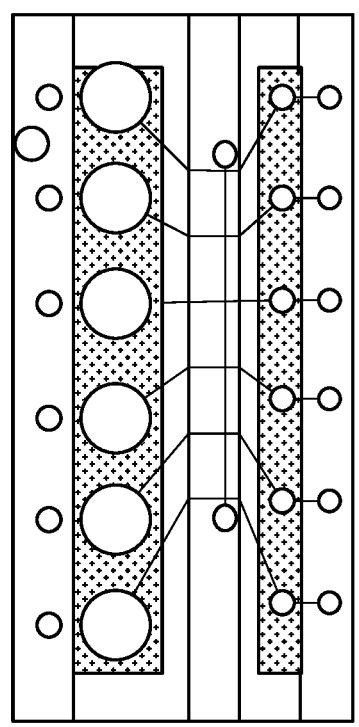
FIG. 5 shows the realisation of a microfluidic circuit 1 corresponding to the sketch displayed on FIG. 3 (FIG. 5a) and, in FIG. 5b, the response of the pressure sensors 4 under the steady flow of water at 50 □L/min or imposed pressure difference between the in- and outlet of the channel 21

FIG. 5a shows the realisation of the microfluidic circuit 1 corresponding to the sketch displayed on FIG. 3. In FIG. 5a, the microfluidic channel 21 is of square cross-section with width and height being 100 μm. It is connected to the 12 upper cavities 41 arranged on both sides of the microchannel via narrow channels 43 of width 50 μm and height 100 μm. 6 upper cavities have a diameter of 4 mm and 6 have a diameter of 1 mm, all upper cavities have a height of 100 μm. All upper cavities 41 are connected to an outlet opposite the channel 43. The microfluidic channel as well as the upper cavities together with the outlets and the connecting channels are comprised in the upper layer. On the bottom of the upper layer 11 the PDMS membrane 13 separates the latter from the bottom layer 12. The PDMS membrane is of thickness 100 μm. In the bottom layer 2 lower cavities 42 are positioned below the arrays of upper cavities 41. and are sufficiently wide (5 mm and 2 mm respectively) and long (20 mm) to completely cover the array of small and large cavities respectively. Their height is of 200 μm. Two slabs of photonic gel of thickness 200 μm are positioned in the lower cavities and closely fill the latter, except for a small gap on both sides allowing for lateral expansion once the gel is compressed from above. The lower cavities are connected to in and outlets to circulate buffer fluid such as to keep the slab of gel completely immersed at all times.

After calibration, as described in Example 4, the microfluidic chip can be used for local pressure sensing in flowing liquids (for example water).

Figure 5B:
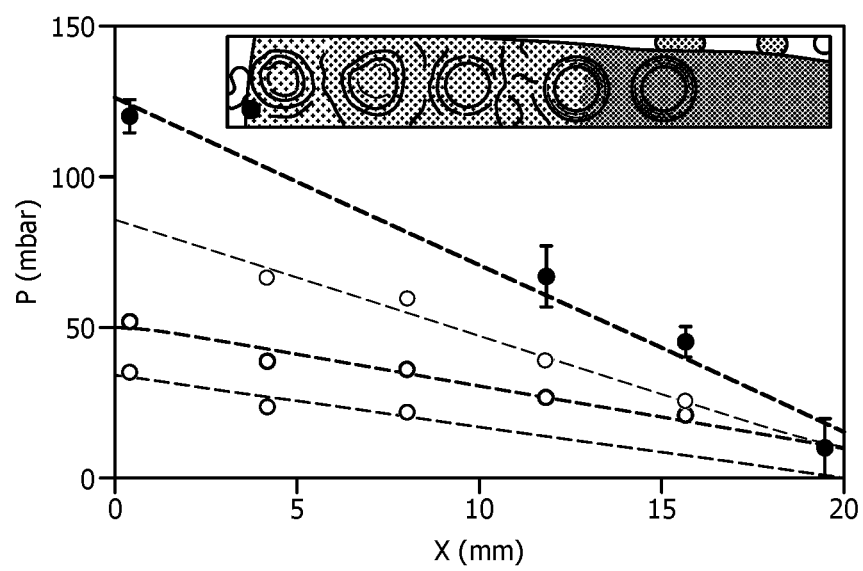

It was first tested by imposing a steady flow of water (flow rate: 50 μL/min) in the straight channel, and leaving the outlet open to the atmosphere. The response of the large sensors (upper cavities 4 mm in diameter) to this flow is shown in the inset of FIG. 5b. A pressure gradient is visible along the channel. Note that the pressure at the last sensing location is not large enough to actuate the last sensor. Using calibration curves linking the observed colour to the applied pressure (see example 4) the pressure profile in the channel is obtained and is plotted with blue dots in FIG. 5b. The obtained profile is linear, as expected, and gives a total pressure drop of about 50 mbar, which is in very good agreement with the 47 mbar drop expected from the hydraulic resistance of the channel[9]. The linearity of the measured pressure profile under steady flow has been checked over a wider range by imposing a constant pressure at the inlet (the outlet remaining at atmospheric pressure).

The measured pressure response is shown in FIG. 5b for 3 imposed pressure drops. All profiles are linear as expected. At small pressure drops, the sensors closer to the outlet cannot be used as explained above. For very large pressure drops, the large sensors saturate (see calibration example 4). The small sensors can however provide complementary information (see calibration example 4) and were used for the highest data point at pressure drop of 150 mbar.

Example 2: Realisation of a Microfluidic Chip According to the Second Embodiment In FIG. 2, a microfluidic chip according to the second embodiment is schematically represented, which comprises a microfluidic circuit with an embedded flow channel 21 through which a fluid circulates and along which the fluid flow pressure is to be measured, and one integrated pressure sensing unit 4 able to measure the fluid flow pressure along the main flow channel 21.

This microfluidic chip comprises two moulded PDMS transparent layers 11, 12 obtained by standard soft lithography technique[9] and a thin and transparent PDMS membrane 13 that is able to deform under the pressure exerted by the fluid. The two moulded PDMS layers 11, 12 and the membrane 13 are arranged as follows:

- one layer 11 is a top layer in which the main flow channel 21 is embedded at a surface 110 of the top layer 11 facing
- the other layer 12 that is a bottom layer comprising at least one lower cavity 42 formed at its surface 120 and containing a slab of a photonic hydrogel 6 immersed in a aqueous buffer solution. The preparation of the photonic hydrogel 6 is described in example 3,
- the membrane 13 resting on the gel slab 6 separates the top layer 11 from the bottom layer 12, and thus the flow channel from the lower cavity 42.

The lower cavity 42 containing the photonic gel 6 and the part of the membrane 13 covering the lower cavity 41 form an integrated sensing unit 4. In the embodiment shown in FIG. 1A, the lower cavity 42 is positioned so as to be placed directly the main flow channel 21.

FIG. 6 shows the realisation of a microfluidic circuit 1 corresponding to the sketch displayed on FIG. 2 (FIG. 6a) having a microfluidic circuit with an embedded flow channel 21 through which a fluid circulates and along which the fluid flow pressure is to be measured, and one rectangular lower cavity able to measure the fluid flow pressure along the main flow channel 21. The main flow channel is a straight channel with a length L of 20 mm and square cross-section of width w=100 μm and height h=100 μm. The flow channel is separated from the rectangular lower cavity 42 by a transparent PDMS membrane of thickness 100 □m 13. The lower cavity has a height of 200 □m and is large enough to completely cover the microfluidic channel 21. FIG. 6A also shows top views taken with a camera in reflection using white light are shown for uniform pressure loading, with pressures increasing from top to bottom: 0 mbar, 25 mbar, 35 mbar, 45 mbar, 55 mbar and 70 mbar.

On FIG. 6B the hue-value profiles are shown for cross-sections along the channel thickness for different imposed static pressures. Those measurements can be used for calibration of the device (see example 4).

FIG. 6C shows a non-uniform pressure profile as imposed by a steady flow of liquid: visual information (top) hue values (bottom). Using a calibration curve (see example 4) these hue values can be converted into local pressure measurements.

Example 3: Preparation and Characterisation of the Soft Photonic Gel

The pressure sensing gel is fabricated similarly to a previously reported lamellar sheet hydrogel [12]. It consists of uniaxially aligned reflective bilayers of PDGI (homo-polymerized poly(dodecyl glyceryl itaconate)) and a chemically crosslinked elastic hydrogel matrix of PAAm (poly-acrylamide). A large sheet of soft PDGI/PAAm hydrogel with this lamellar bilayer structure parallel to the sheet surface was fabricated by slightly modifying the procedure described by Haque et. al. [12]. Briefly, a polymerization chamber is made of two parallel glass plates separated by 0.1 mm-thick silicone spacers. The reaction chamber possesses an inlet hole to be filled with the precursor solution (aqueous mixture of 0.1 M DGI, 0.0025 mM SDS, 2.0 M AAm, 2 mM crosslinker and 2 mM photo-initiator) and an outlet hole connected to an automatic suction pump by a polyethylene tube. Prior to the polymerization, the precursor solution is sucked out of the chamber causing strong shear in the narrow gap between the two glass plates and thousands of lamellar bilayers of self-assembled DGI are formed, perfectly aligned in one direction parallel to the surface of glass substrate. In order to get stable PDGI bilayers in the hydrogel, this step is followed by a rapid polymerization by exposing the reaction chamber to UV light (365 nm) at 50° C. for 8 h under an inert Ar atmosphere. After polymerization, PDGI bilayers are trapped inside PAAm matrix. The PDGI/PAAm gels synthesized in this way are swollen in bi-distilled water for one week with regular freshwater replacement to avoid residuals. To further reduce the moduli of the equilibrium swollen PDGI/PAAm in a 2nd step, the parent PDGI/PAAm gels of 100 □m-thick were hydrolyzed using a modified procedure that was described previously by Yue et. al. (8). The parent gels were soaked in 1M KOH(aq) aqueous solution for 30 min, followed by heating in an incubator at 50° C. for 5 min. The process of hydrolysis partially changes the amide functional groups (PAAm) of the parent PAAm hydrogel layers to sodium carboxylate groups (PAAc-Na). The obtained hydrogel, which contains partially hydrolyzed PAAm (PAAcNa), was then extensively washed several times with deionized water for achieving an equilibrium swelling state. The softness of this hydrolyzed PDGI/PAAm gel is controlled (modulus of 5 to 100 mbar) by maintaining the pH of the water. To be used as microfluidic pressure sensors the soft photonic hydrogel of thickness 140 □m were maintained in a buffer solution at pH=6.92 using 0.2 M KOH(aq) and 0.2 M KH2PHO4(aq).

Example 4: Calibration

The multilayer structure of the soft photonic hydrogel selectively diffracts visible light, so that it appears coloured under reflective white illumination. The gel diffracts longer wavelengths in its undeformed state (red colour), and shorter wavelengths when compressed (gradual shift to blue colour).

The response curve of such a photonic gel in terms of the reflected wavelength A, measured with a spectrometer, as a function of a pressure P uniformly applied to the gel has already been presented in [8]. For pressure-sensing applications, we measure and quantify the colour-switching of the gel with a simpler equipment such as a colour camera and illumination in reflection with white light via a calibration step. This calibration method detailed here is used for the examples 1 and 2 presented above.

Figure 4A:
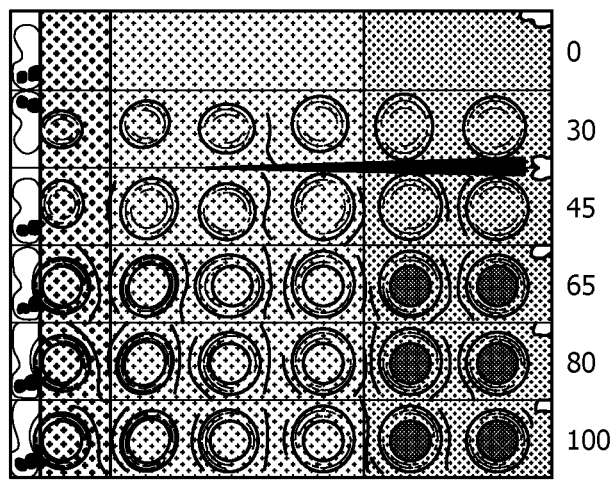
FIG. 4a shows the response of the pressure sensors under uniform and static pressure loading: top view of an array of sensors (4). The upper cavities are circular cavities of height 100 microns and diameter 4 mm connected to a uniform and static pressure via a channel (43). Colour images are taken with a camera in reflection using white light and are shown for increasing pressure (in mbar) from 0 to 100 mbar, i.e. from 0 to 10 kPa.

FIG. 4a shows the realisation of several pressure sensing units 4 as described on FIG. 1 integrated into a microfluidic device as shown on FIG. 3 and as discussed in example 1. The upper cavities 41 have a radius of 4 mm and are separated from the lower cavity by a PDMS membrane of thickness 100 □m. The thickness of the slab of gel 6 positioned in the lower cavity is 200 μm. The gel is immersed in an aqueous buffer solution. The lower cavity is rectangular and completely covers the upper cavities. A static pressure is applied to the pressure sensing units via the inlets 43. This pressure is increased stepwise and a colour image of the sensors is taken for each pressure value. Examples of pictures for increasing pressure from top to bottom (0 mbar to 100 mbar) are shown on FIG. 4a. At zero applied pressure, the gel strip 6 in the lower cavity 42 is of uniform red colour. When the pressure in the upper cavities 41 is increased, the membrane 13 presses on the gel, making it locally compressed: circular spots appear on the gel strip, which shift towards blue colours as the pressure is increased.

The colour on the pictures taken by the camera needs to be quantified. To do so, we use a grayscale intensity map of the hue-value H (Hue-Saturation-Value colour model). The diffracted light is monochromatic, which is why the H value is a good proxy for the measure of the wavelength. We will thus quantify the colour response of the gel with the hue-value H of the images acquired with a colour camera, under reflected white lighting.

Figure 4B:
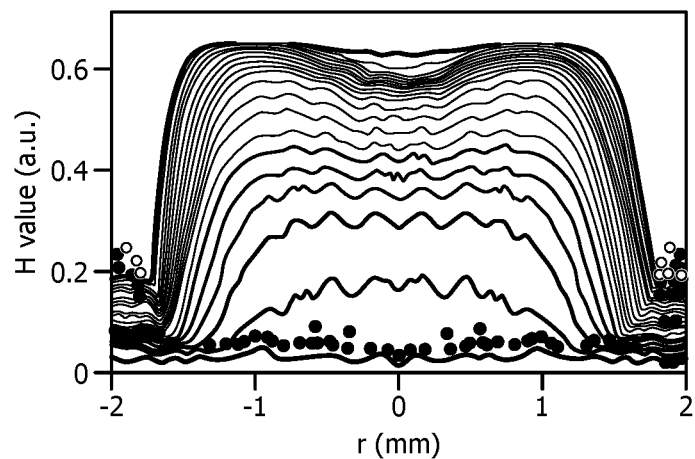
FIG. 4B is the hue-value profile across the diameter of a sensor (4th sensor from the left, pressure increases from 0 to 140 mbar, i.e from 0 to 14 kPa)
Figure 4C:
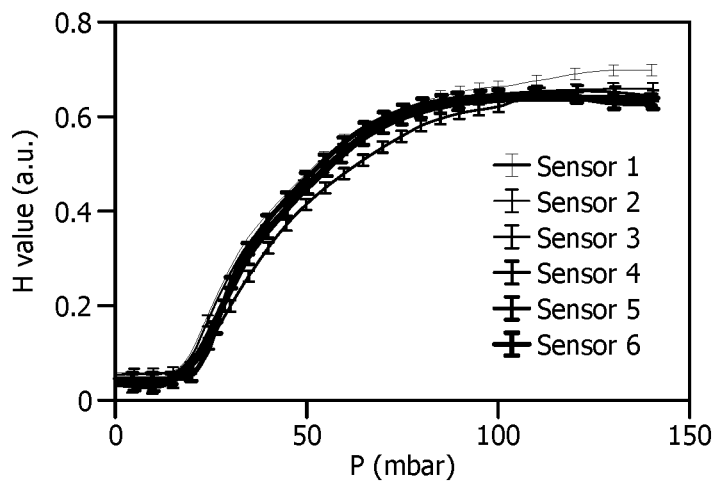
FIG. 4C is a calibration curve: hue-value as a function of the applied pressure.

Because of the circular shape of the upper cavity 41, the hue profile is axisymmetric. To get optimal resolution, we thus detect the centre of each cavity and average the H value over the azimuthal direction. The resulting radial H profiles for the $4^{th}$ cavity from the left are shown in FIG. 4b for a pressure increasing from 0 to 140 mbar.

We use the hue value at R/2, where R is the radius of the upper cavities, to build the calibration curve of the pressure sensing unit, shown in FIG. 2c. Calibration curves of different sensing units are very similar, which is expected and confirms the good reproducibility of the method. We see a quasi linear increase of the hue value between 20 and 80 mbar which corresponds to the working range of the pressure sensing unit presented. For higher pressures the calibration curve saturates, and the pressure sensing units cannot measure such large pressures. The example shown here represents the smallest pressures that we have measured with our device. Those values are directly given by the compressive modulus of the gel. The device can be adapted to be used for larger pressure values by using a smaller diameter of the upper cavity (down to 200 µm). Then the deformation of the membrane held fixed at the boundaries of the upper cavity starts to play a role and higher pressures are needed to deform the gel. This can advantageously be used to tune the range accessible for our pressure sensor.

It is preferable to perform a calibration step for each separable pressure sensing unit or microfluidic chip for each new realization of a chip according to the invention.

REFERENCES

1. Li, H., Luo, C., Ji, H., Ouyang, Q. & Chen, Y. *Micropressure sensor made of conductive pdms for microfluidic applications*. Microelectron. Eng. 87, 1266-1269 (2010).
2. Park, Y.-L., Majidi, C., Kramer, R., Bérard, P. & Wood, R. J. *Hyperelastic pressure sensing with a liquid-embedded elastomer*. J. Micromechanics Microengineering 20, 125029 (2010).
3. Wang, L. et al. *Polydimethylsiloxane-integratable micropressure sensor for microfluidic chips*. Biomicrofluidics 3, 034105 (2009).
4. Hosokawa, K., Hanada, K. & Maeda, R. *A polydimethylsiloxane (pdms) deformable diffraction grating for monitoring of local pressure in microfluidic devices*. J. micromechanics microengineering 12, 1 (2001).
5. Song, W. & Psaltis, D. *Optofluidic pressure sensor based on interferometric imaging*. Opt. letters 35, 3604-3606 (2010).
6. Orth, A., Schonbrun, E. & Crozier, K. B. *Multiplexed pressure sensing with elastomer membranes*. Lab on a Chip 11, 3810-3815 (2011).
7. Escudero, P., Yeste, J., Pascual-Izarra, C., Villa, R. & Alvarez, M. *Color tunable pressure sensors based on polymer nanostructured membranes for optofluidic applications*. Sci. reports 9, 3259 (2019).
8. Yue, Y. et al. *Mechano-actuated ultrafast full-colour switching in layered photonic hydrogels*. Nat. communications 5, 4659 (2014).
9. Tabeling, P. *Introduction to microfluidics* (Oxford University Press on Demand, 2005).
10. Tsujii, K., Hayakawa, M., Onda, T. & Tanaka, T. *A novel hybrid material of polymer gels and bilayer membranes*. Macromolecules 30, 7397-7402 (1997).
11. Ilyas, M. et al. *Water-triggered ductile—brittle transition of anisotropic lamellar hydrogels and effect of confinement on polymer dynamics*. Macromolecules 50, 8169-8177 (2017).
12. Hague, M. A.; Kamita, G.; Kurokawa, T.; Tsujii, K.; Gong, J. P. *Adv. Mater.* 2010, 22, 5110-5114.

The invention claimed is:

1. Pressure sensing unit able to measure a fluid pressure, characterized in that it comprises two layers made of a liquid-tight material and a membrane,
    wherein one at least of said two layers is made of a material that is also light transparent,
    wherein said membrane is impermeable to the fluid to be characterized and is able to deform under the pressure exerted by the fluid,
    characterized in that said layers and said membrane are arranged according to the following configuration:
        one layer is a top layer comprising an upper cavity,
        another layer is a bottom layer comprising one lower cavity formed at its surface and facing the upper cavity of said top layer, said lower cavity containing a slab of a photonic hydrogel immersed in an aqueous buffer solution,
    said membrane separates the top layer from the bottom layer.

2. Microfluidic or millifluidic chip comprising:
    a microfluidic circuit with an embedded flow channel through which a fluid circulates and along which the fluid flow pressure is to be measured, and
    at least one separable pressure sensing unit,
    characterized in that the separable pressure sensing unit is the pressure sensing unit of claim 1, that is positioned at a distance from said main flow channel so that the upper cavity of the pressure sensing unit is connected to the main flow channel via a side channel.

3. Microfluidic or millifluidic chip according to claim 2, wherein the photonic hydrogel is a soft photonic hydrogel.

4. Microfluidic or millifluidic chip according to claim 2, comprising a plurality of sensing units positioned at different locations along the main flow channel.

5. Microfluidic or millifluidic chip according to claim 4, wherein each upper cavity is cylindrical in shape with a diameter of 0.1 to 10 mm, and preferably of 1 mm to 4 mm.

6. Microfluidic or millifluidic chip according to claim 2, wherein each upper cavity is connected to an outlet opposite to the main channel.

7. Microfluidic or millifluidic chip according to claim 2, wherein the top layer and the bottom layer are made of moulded PDMS, plastic material or glass.

8. Method for a direct and contact-free measuring of a local pressure of a fluid circulating in a microfluidic circuit, said method comprising the following steps:
    A. providing a microfluidic or millifluidic chip as defined in claim 2;
    B. imaging the photonic hydrogel contained in the lower cavity of the pressing unit of said microfluidic chip with a camera observing in reflexion said pressing unit.

9. Use of the method according to claim 8, in which a microfluidic or millifluidic chip comprising: a microfluidic circuit with an embedded flow channel through which a fluid circulates and along which the fluid flow pressure is to be measured, and at least one integrated pressure sensing unit able to measure the fluid flow pressure at a position along said main flow channel, said microfluidic chip being characterized in that it comprises two layers made of a liquid-tight material and a membrane, wherein one at least of said two layers is made of a material that is also light transparent, wherein said membrane is impermeable to the fluid circulating in the channel and is able to deform under the pressure exerted by the fluid, said layers and said membrane being arranged according to the following configuration: one layer is a top layer in which the main flow channel is embedded at a surface of the top layer facing another layer is a bottom layer comprising one lower cavity formed at its surface and containing a slab of a photonic hydrogel immersed in a aqueous buffer solution wherein said lower cavity is positioned so as to be placed directly under the main flow channel, wherein said lower cavity containing the photonic gel and the part of the membrane covering said lower cavity form the sensing unit is used for measuring a static pressure as low as 2 kPa with a resolution below 50 Pa.

10. Use of the method according to claim 8, in which a microfluidic or millifluidic chip comprising a microfluidic circuit with an embedded flow channel through which a fluid circulates and along which the fluid flow pressure is to be measured, and at least one separable pressure sensing unit, characterized in that the separable pressure sensing unit is the pressure sensing unit of claim 1, that is positioned at a distance from said main flow channel so that the upper cavity of the pressure sensing unit is connected to the main flow channel via a side channel is used for measuring a dynamic pressure as low as 2 kPa with a resolution below 50 Pa is measured.

11. Microfluidic or millifluidic chip comprising:
    a microfluidic circuit with an embedded flow channel through which a fluid circulates and along which the fluid flow pressure is to be measured, and
    at least one integrated pressure sensing unit able to measure the fluid flow pressure at a position along said main flow channel, said microfluidic chip being characterized in that it comprises two layers made of a liquid-tight material and a membrane,
wherein one at least of said two layers is made of a material that is also light transparent,
wherein said membrane is impermeable to the fluid circulating in the channel and is able to deform under the pressure exerted by the fluid,
said layers and said membrane being arranged according to the following configuration:
    one layer is a top layer in which the main flow channel is embedded at a surface of the top layer facing
    another layer is a bottom layer comprising one lower cavity formed at its surface and containing a slab of a photonic hydrogel immersed in a aqueous buffer solution,
wherein said lower cavity is positioned so as to be placed directly under the main flow channel,
    wherein said lower cavity containing the photonic gel and the part of the membrane covering said lower cavity form the sensing unit.

* * * * *